United States Patent [19]
Schultz et al.

[11] 3,769,502
[45] *Oct. 30, 1973

[54] HOSPITAL SERVICE UNIT

[75] Inventors: John R. Schultz; John W. Heidacher; John M. Sharer; James S. Adams, all of Batesville, Ind.; Frank M. Damico, Plover, Wis.

[73] Assignee: Hill-Rom Company, Inc., Batesville, Ind.

[ * ] Notice: The portion of the term of this patent subsequent to May 2, 1989 has been disclaimed.

[22] Filed: May 1, 1972

[21] Appl. No.: 249,226

Related U.S. Application Data

[63] Continuation-in-part of Ser. No. 83,762, Oct. 26, 1970, Pat. No. 3,660,591.

[52] U.S. Cl............................ 240/4, 52/28, 240/9 R, 240/51.11 R, 240/73 R
[51] Int. Cl.............................................. A47b 97/00
[58] Field of Search ...................... 240/4, 1 R, 2 R, 240/51.11 R, 73 R, 9 R; 52/28, 36

[56] References Cited
UNITED STATES PATENTS

| | | | |
|---|---|---|---|
| 3,032,057 | 5/1962 | Mays............................... | 128/172 X |
| 3,250,583 | 5/1966 | Phillips............................. | 312/209 |
| 3,267,332 | 8/1966 | Bobrick............................ | 174/48 |
| 3,461,349 | 8/1969 | Meyer.............................. | 174/48 |
| 3,462,892 | 8/1969 | Meyer.............................. | 174/49 |
| 3,514,794 | 6/1970 | Pofferi............................. | 5/2 R |
| 3,354,301 | 11/1967 | Bobrick............................ | 240/2 R |
| 3,462,892 | 8/1969 | Meyer.............................. | 52/28 |
| 3,200,244 | 8/1965 | Meyer.............................. | 240/2 R |
| 3,379,870 | 4/1968 | Muller et al. .................... | 240/73 R |
| 2,998,508 | 8/1961 | Bobrick............................ | 240/2 R |
| 3,692,920 | 9/1972 | Santarelli....................... | 240/2 R X |

*Primary Examiner*—Richard L. Moses
*Attorney*—Robert V. Jambor et al.

[57] ABSTRACT

A hospital service unit, equipped with electrical and patient care facilities which is adapted to be mounted upon the headwall of a hospital room. The mounting of the module is simply accomplished and after the module is secured on the wall, the electric and gas leads are connected externally of the enclosure to complete the installation.

42 Claims, 26 Drawing Figures

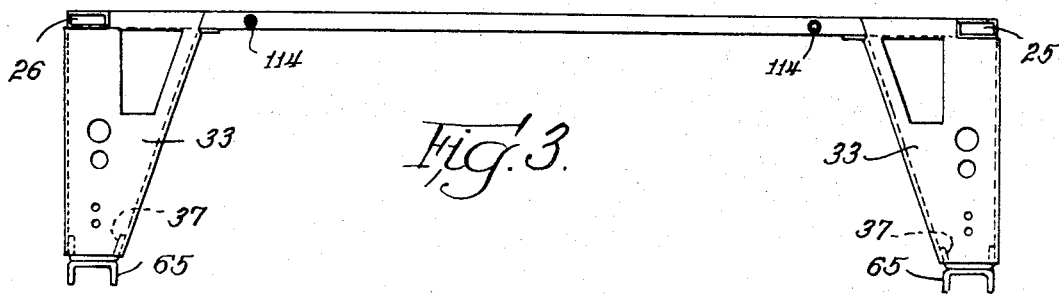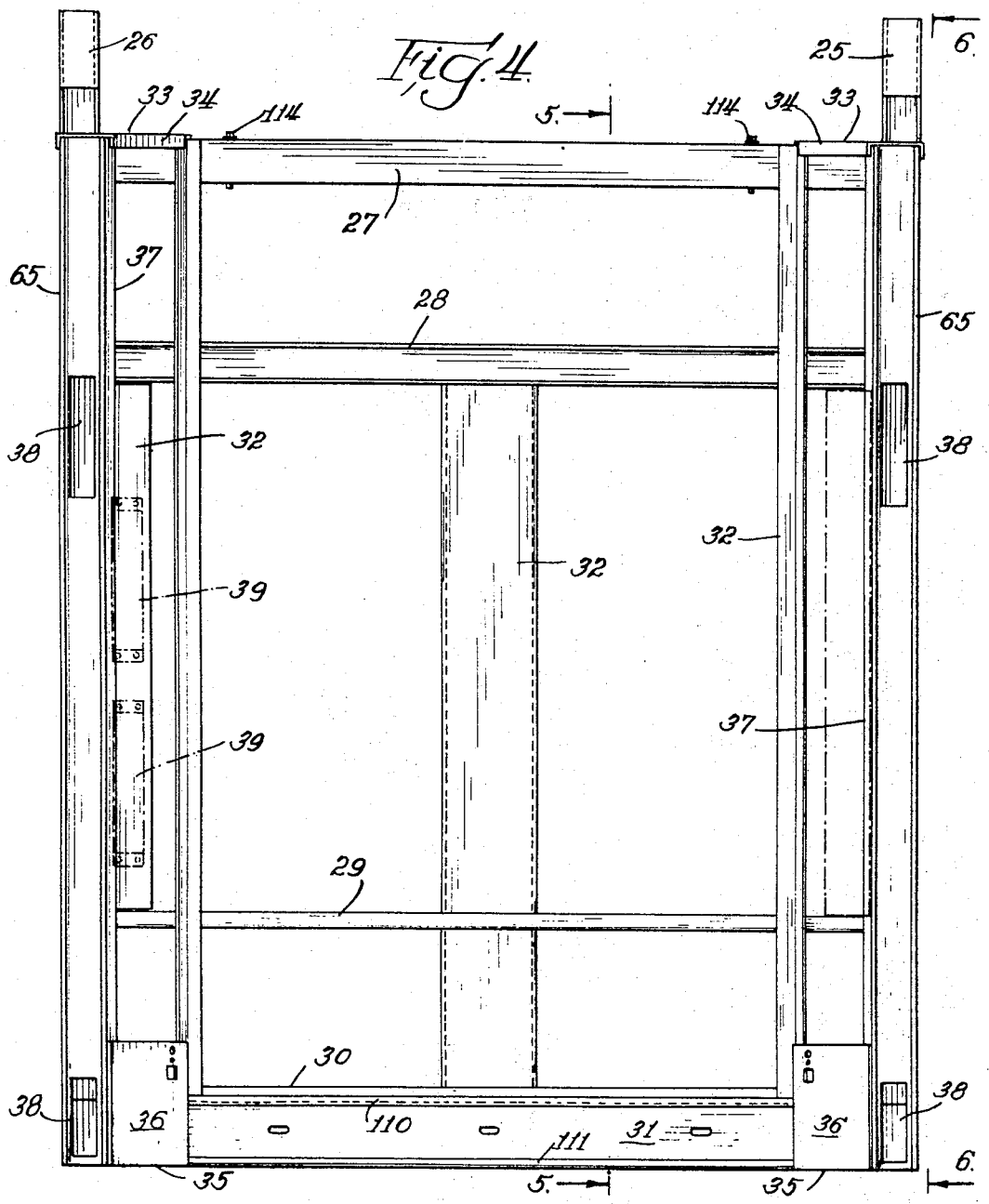

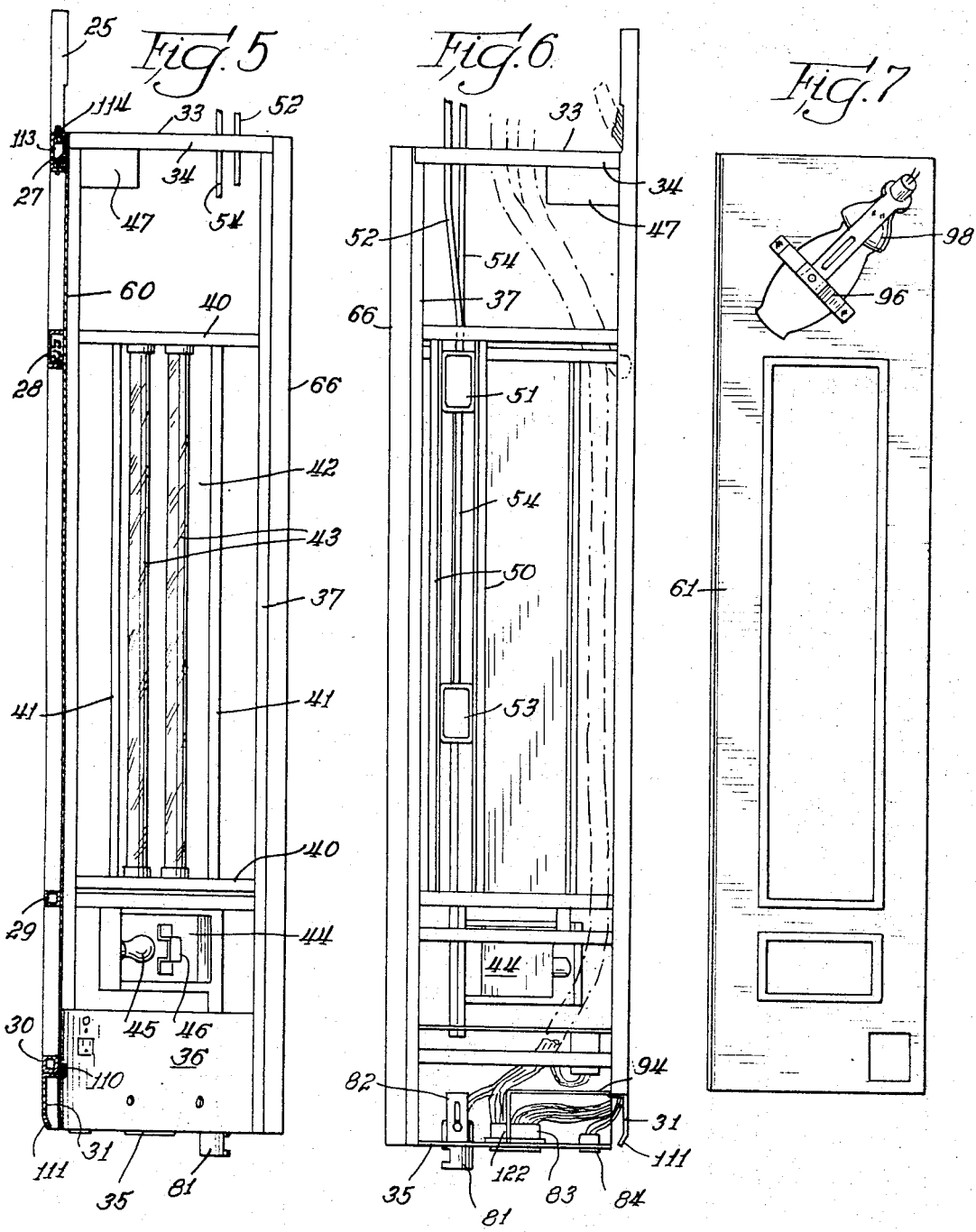

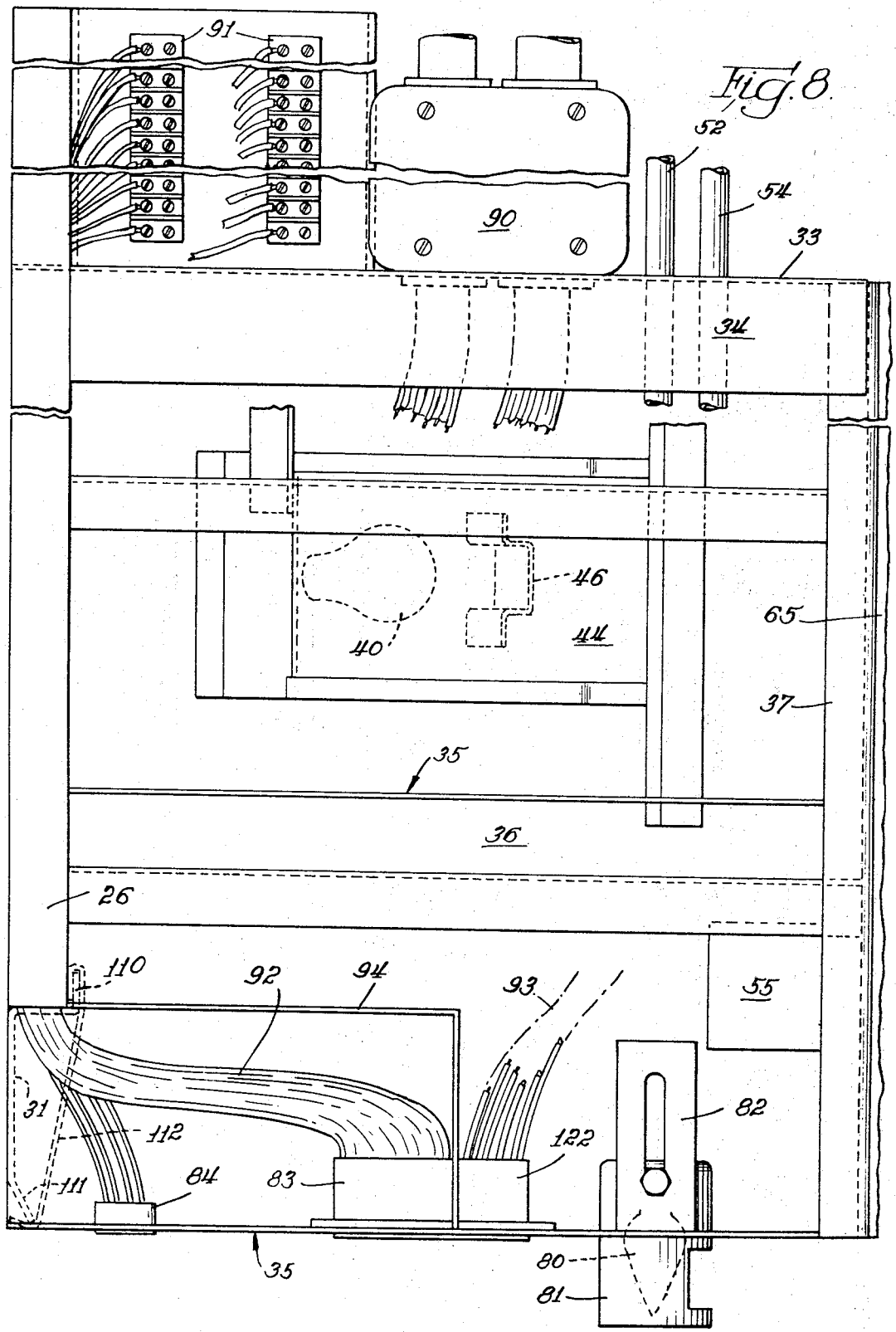

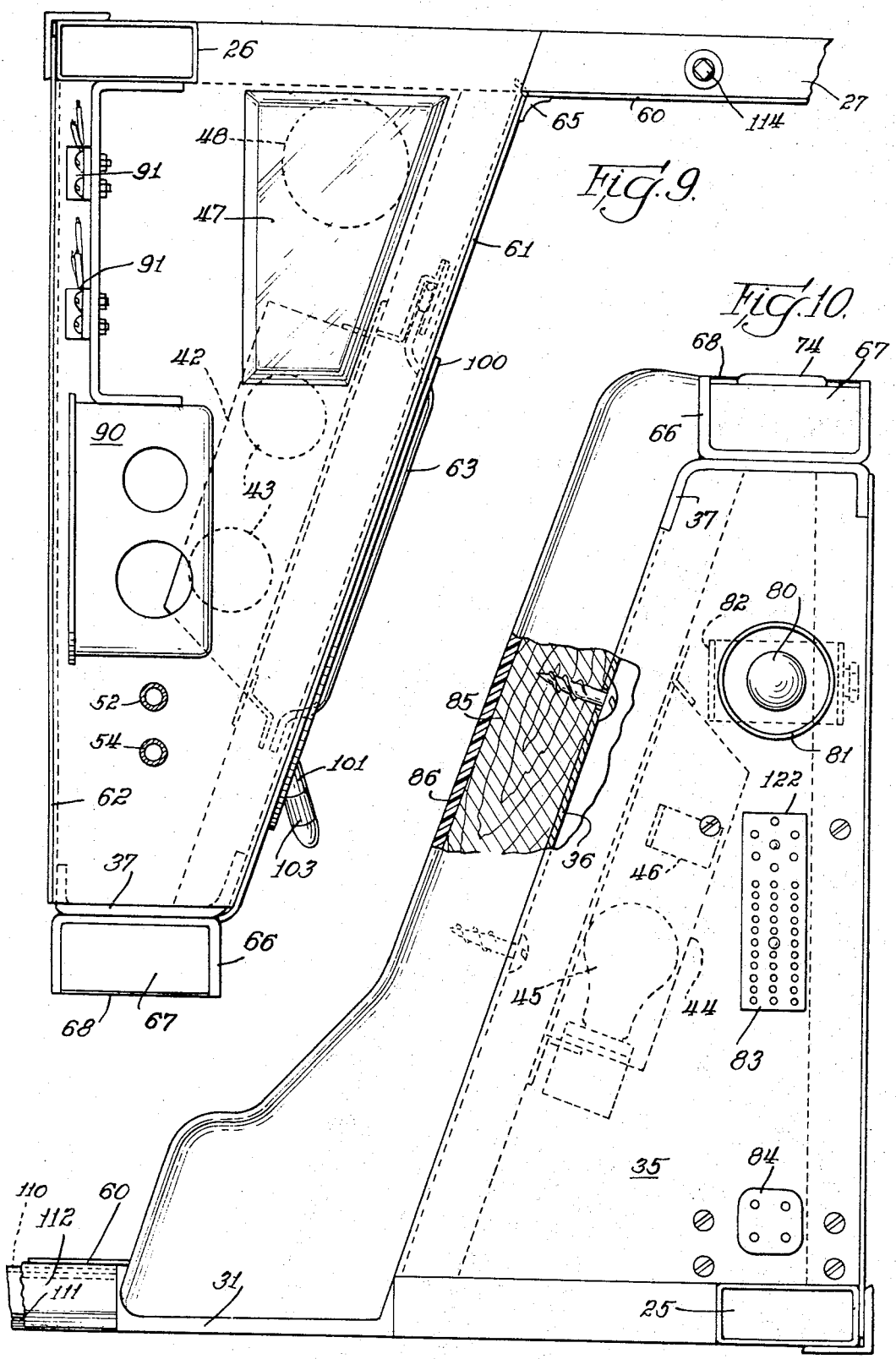

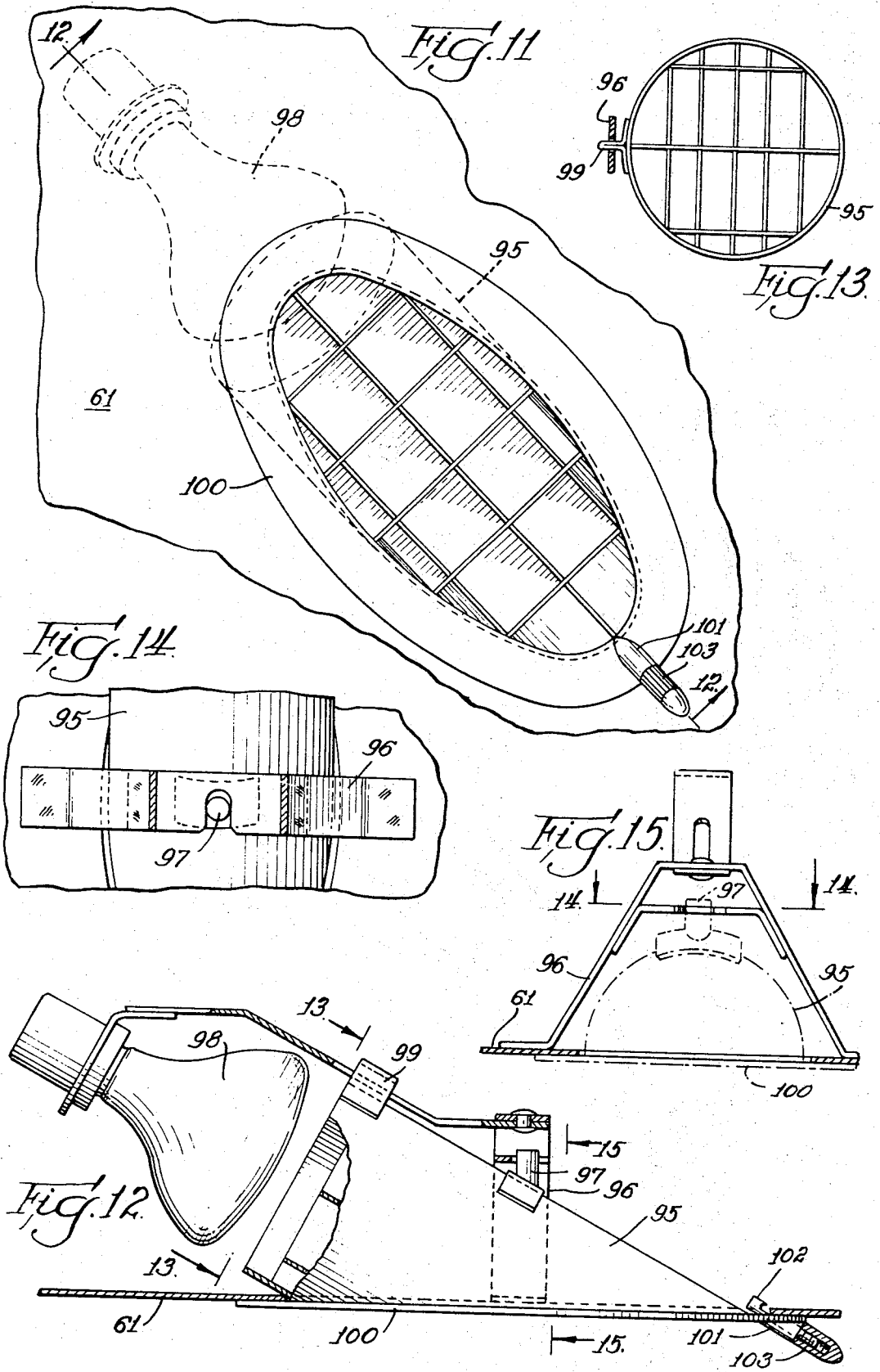

PATENTED OCT 30 1973 3,769,502
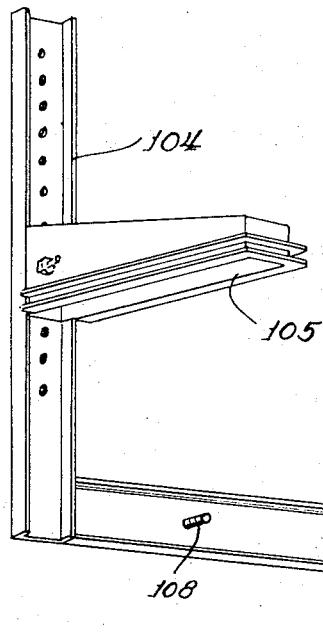
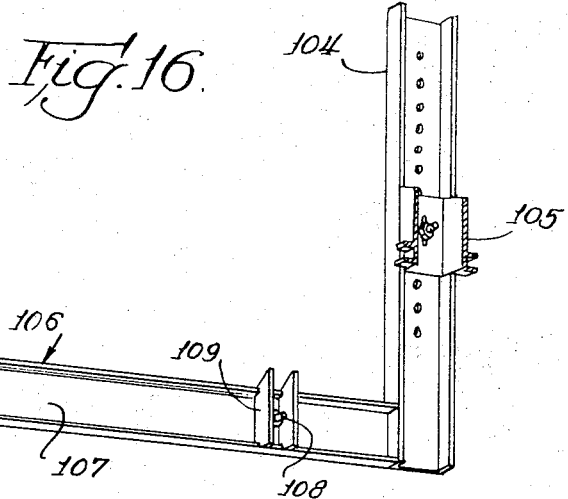
Fig. 16.
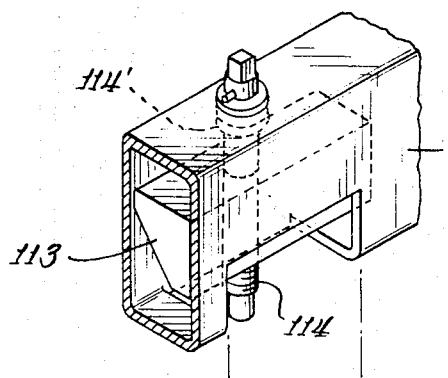
Fig. 17.
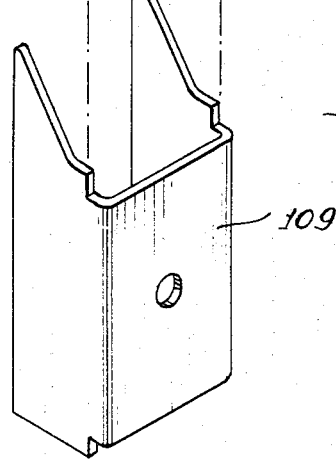
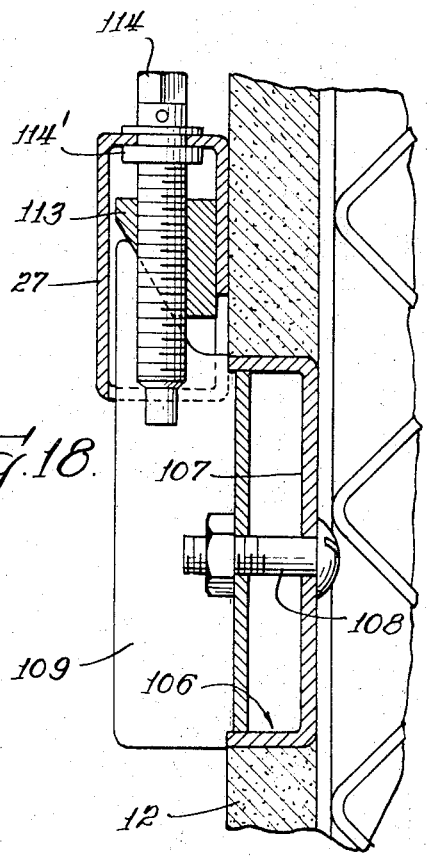
Fig. 18.

HOSPITAL SERVICE UNIT

CROSS-REFERENCE TO OTHER APPLICATION

This application is a continuation-in-part application of application for United States Letters Patent Ser. No. 83,762, now U.S. Pat. No. 3,660,591 filed Oct. 26, 1970, by Messrs. Schultz, Heidacher, Sharer, Adams and Damico, entitled HOSPITAL IN-PATIENT SERVICE CORE MODULE.

BACKGROUND OF THE INVENTION

In the construction of the patient's room in a hospital, the headwall is a most expensive item. This is because this wall, against which the head of the patient's bed is located, must contain the facilities required for the care and treatment of a patient. These facilities include electrical outlets, gas source supplies and communication facilities, all of which are installed within the wall during the construction thereof. This type of headwall construction is at a disadvantage in that the electrical outlets, which are several in number, are in part at least disposed at some distance from the hospital bed with the result that long cords are required to connect electricity to the bed and to equipment used in the treatment and care of a patient. The arrangement is at a further disadvantage in that equipment used in the care of a patient which requires a ground connection, such as is required by an electrocardiograph, is often difficult to find a proper ground for the device. The present invention seeks to overcome these difficulties and disadvantages and to reduce the cost of construction of a patient's quarters in a hospital.

SUMMARY OF THE INVENTION

The present invention comprises a factory made self-contained core module having a framework that supports the various light fixtures, gas valves, electrical switches, circuit breakers and the like. The framework consists of the wall section generally rectangular in shape and equipped for mounting upon the headwall of a patient's room in a convenient manner. The framework also consists of side sections which are generally wedge shaped and project from the opposite vertical edges of the wall section. The framework is covered by a suitable backwall panel and inside and outside panels on the faces of the side sections of the framework.

When mounted upon the headwall of the hospital patient's room, the module is disposed above the floor of the room a sufficient distance to permit normal use of the floor care machinery employed in care of the floor. The module does not extend completely to the ceiling of the room, but rather, terminates below the ceiling. Extensions of the side sections conveniently referred to as service covers, extend from the upper surface of the core module through the ceiling of the room.

In modern hospital construction, the ceilings in patients' rooms are disposed an appreciable distance below the floor of the room above. In this space, the electrical conduits, the gas and vacuum lines and communication cables are located as are heating and venting ducts as may be required. After the module has been secured upon the headwall, the electrical wires, communication cable and gas conduits are connected to the module after which the service covers are installed to complete the installation of the module.

Located at the bottom of the module are guides adapted to be engaged by the head legs of a hospital bed to position that bed in a desired location with respect to the module. The invention contemplates using the so-called electronic bedside cabinet in connection with the bed and the communication cable, telephone connection and power to the bedside cabinet are extended from the module to the cabinet. In certain instances, in intensive care rooms, bedside cabinets will not be used and all of the lights in the module will be controlled by switches located in the module.

In the preferred form, examining lights are mounted near the top of the inside panel of each side section of the module and switches for controlling these examining lights are located at the front edge of each side section. Also located in these side sections are observation lamps located in approximate alignment with the top edge of the mattress of the bed when that bed is in its normal low position. Switches for controlling the observation lights are also located on the front edges of the side sections of the module. Also located on the front edges of the side sections are several electrical receptacles, each protected by a circuit breaker. Also located on these edges are grounding bars which provide a convenient way to ground a piece of hospital equipment, such as an electrocardiograph, which requires a ground connection.

Also located on the inner surfaces of the side sections are a pair of vertically disposed reading lamp means on each side section. These lamps are controlled by the patient through switches located in the bedside cabinet. In instances where no bedside cabinet is used, these lamps will be controlled from switches in the module. Also located in each side section is a ceiling lamp which is also controlled by a switch on the bedside cabinet.

Positioned at the bottom of each side section of the module is a small wattage night lamp which burns continuously enabling a night nurse to observe the location of the bed when making her rounds. Should further observation of the patient be required, the nurse can turn on the observation lights from either side of the bed, and since these lights are located low with respect to the patient, a minimum disturbance of the patient results.

The lighting arrangement of the core module provides a distinct improvement over the prior art of which we are aware. The vertically disposed reading lamp means provides an ample glare-free light for reading. The examining light arrangement provides adequate light for examination of a patient without the use of auxiliary lighting.

BRIEF DESCRIPTION OF THE DRAWINGS

FIG. 3 is a top plan view of the framework of the module of FIG. 1;

FIG. 4 is a front elevational view of the framework;

FIG. 5 is an elevational view of the inner face of a side section of the framework with lighting equipment installed therein;

FIG. 6 is an elevational view of the outer face of a side section framework with gas equipment installed therein;

FIG. 7 is an elevational view of the outside face of a panel for the framework shown in FIG. 5 with an examining light fixture installed thereon;

FIG. 8 is an elevational, somewhat diagrammatic, view of a side section framework drawn to an enlarged scale with parts broken away and showing the communication cable junction bars, the electrical junction box and certain lighting units installed therein;

FIG. 9 is a topside plan view of a side section of the module of FIG. 1;

FIG. 10 is a bottom side view of a side section of the module of FIG. 1.

FIG. 11 is an elevational view of an examining light unit drawn to an enlarged scale;

FIG. 12 is an elevational view of the unit partially in section;

FIG. 13 is a cross-sectional view of the unit taken along the line 13—13 of FIG. 12 looking in the direction of the arrows;

FIG. 14 is a cross-sectional view of the unit taken along the line 14—14 of FIG. 15 looking in the direction of the arrows;

FIG. 15 is a cross-sectional view along the line 15—15 of FIG. 12 looking in the direction of the arrows;

FIG. 16 is a perspective view of a wall mounting frame and ceiling boot;

FIG. 17 is a perspective view of the leveling wedge and mounting bracket;

FIG. 18 is a cross-sectional view taken substantially along the line 5—5 of FIG. 4 and showing the mounting bracket registered with the mounting frame and the leveling wedge registered with the mounting bracket;

DESCRIPTION OF THE PREFERRED EMBODIMENT

Figure 1:
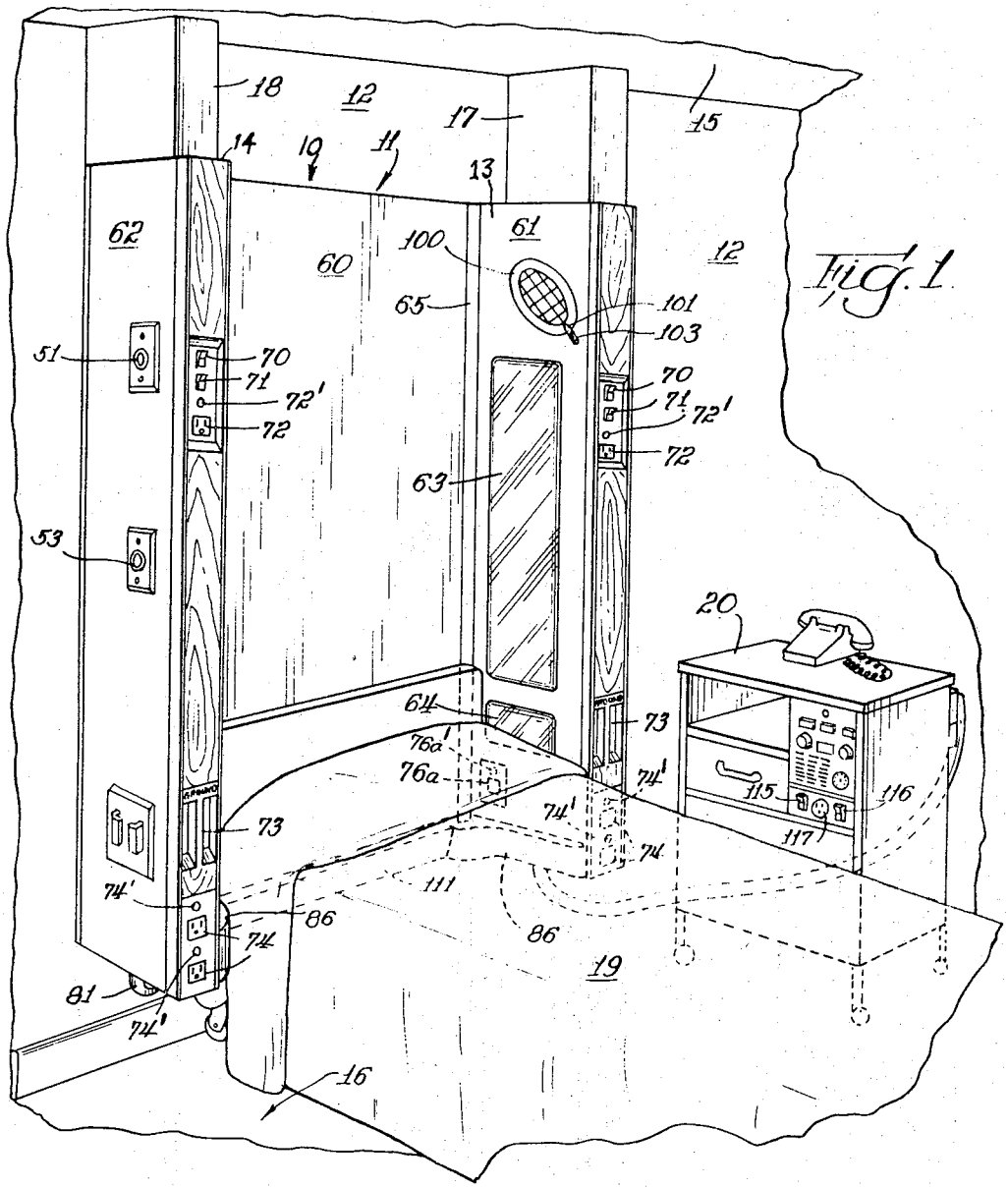
FIG. 1 is a perspective view of the core module mounted upon the headwall of a hospital room, with a hospital bed registered therewith and an electronic bedside cabinet connected thereto.

Referring now to the drawings in more detail, in FIG. 1 will be seen that the core module indicated generally at 10 has a wall section indicated generally at 11 adjacent the wall 12 of the room. Extending forwardly from the wall section 11 are side sections 13 and 14. It will be noted that the top of the module 10 is beneath the ceiling 15 of the room and the bottom of the module is spaced above the floor 16 thereof a distance sufficient to permit operation of the floor cleaning equipment without interference from the module.

A service cover 17 extends upwardly from the top edge of the section 13 and through the ceiling as does the service cover 18 extend from the side section 14. The bed 19 is positioned with respect to the module and the electronic bedside cabinet 20 in the example shown is positioned on the left side of a patient in the bed.

As will be seen best in FIGS. 3, 4 and 10, the framework of the module contains vertically disposed rectangular tubes 25 and 26 which extend from the bottom to points well above the top of the module, but below the ceiling of a room in which the module is mounted. A top horizontal bar 27 seen in cross-section in FIGS. 5 and 18 extends between the tubes 25 and 26 and is attached thereto. Disposed below bar 27 is a cross-channel 28 positioned with its web on the back or wall-engaging face of the module. Below the channel 28 are cross tubes 29 and 30 which, in the embodiment shown, are rectangular tubes best seen in FIG. 5. Attached to the lower tube 30 is a lower plate 31 which contains a plurality of elongated perforations for a purpose hereinafter described.

Fixed to the wall tubes 25 and 26 and to the cross-member 27 are wedge shaped upper plates 33 which, from FIG. 3, it will be seen are formed as rights and lefts. Each plate 33 has depending from it a flange 34.

Fixed to the lower ends of tubes 25 and 26 and to the lower cross-tube 30 are bottom plates 35 best seen in FIG. 10, which have upwardly extending flanges 36 best seen in FIGS. 4 and 5. Fixed between the upper and lower plates is a front frame channel 37 which contains rectangular openings 38 for a purpose later explained. Fixed to and extending between the horizontal members of the framework are vertical members 31, one of which may be a plate to which ballasts 39 are attached.

As will be seen best in FIG. 5, the inner face of each of the side sections 13 and 14 of the module frame contain horizontal angle members 40 and vertical members 41, which, between them, support an elongated lamp box 42 in which are mounted two reading lamp means 43.

Also, the frame members support a smaller lamp box 44 in which an observation lamp 45 is positioned. This lamp is a small wattage lamp, and to guard against the possibility of a larger lamp being inserted, a stop 46 is mounted in the lamp box 44. A ceiling lamp box 47 is mounted in the framework adjacent the upper plate 33 thereof.

As will be seen in FIG. 6, the other face of each side section of the module contains horizontally disposed members, preferably angles, between which vertical angles 50 are fixed. Fixed to angles 50 are an oxygen valve 51 and a suction valve 53 to which supply tubes 52 and 54 are connected, respectively.

As will be seen best in FIGS. 1, 9 and 10, the framework is covered by backwall panel 60 and each side section of the module is covered by an inner face panel 61 and the outer surfaces by an outer face panel 62. Panels 61 carry lamp lenses 63 which may be composed of glass or plastic, as desired, and also lamp lenses 64 that cover the observation lamps.

A cove molding 65 is installed at the junction of panels 60 and 61 to give a pleasing appearance to the module.

The framework of the module is composed of metal, preferably steel, and the cover panels 60, 61 and 62 are also composed of steel, the exposed surfaces of which are painted with a color that is the same as, or one that harmonizes with, the color of the walls of the room. If desired, panels 60, 61 and 62 may be covered with a suitable covering material, such as vinyl, which may be of any desired color and may be either plain or patterned, as desired. The resulting structure renders the side sections of the module completely encased and electrical wiring contained therein is protected sufficiently to render conduits and the like unnecessary. Wiring extending from one side of the module to the other can be extended through cross-channel 28 which protects it.

Attached to the front frame channels 37 are trim channels 66 which carry wooden inserts 67 that are faced with veneers 68 which are colored and grained to harmonize with the coloring and grain of the head of the bed and the bedside cabinet.

Mounted in each trim channel 66 is an upper switch 70, a lower switch 71 and an outlet socket 72. Also mounted in the trim channel is a ground bar 73 and a pair of sockets 74. Also mounted in each bottom plate flange 36 is a bed outlet socket 76.

As will be seen best in FIGS. 6, 8 and 10, projecting through an opening in the bottom plate 35 is a night lamp 80, the housing 81 of which is supported in a slotted bracket 82. This permits the lamp to be moved upwardly into the module thereby to prevent damage to the lamp during transportation and installation of the module. In certain instances, a night lamp may not be wanted by a hospital and the housing 81 can be pushed up into the module and retained therein.

Also mounted in plate 35 is a communications receptacle 83 which is a multi-point receptacle and serves to extend the communications cable to the bedside cabinet and also to extend electric power to the bedside cabinet. Also mounted in the bottom plate 35 is a telephone receptacle 84. As indicated in FIG. 6, to guard against the possibility of interference between the electrical equipment and the telephone line, the leads to the telephone receptacle 84 can be extended through a vertical tube 25 or 26.

As will be seen best in FIG. 10, secured to the flange 36 of the bottom plate 35 is a member 85 shaped to position the head end of a bed in a desired location with respect to the module. Preferably member 85 is composed of wood, although the use of other materials is contemplated. The member 85 is faced with a facing 86 which may be rubber or a resilient plastic, as desired.

As will be seen in FIGS. 8 and 9, an electrical junction box 90, communication terminal blocks 91 and gas tubes 52 and 54 are all located in one side section of the module. This arrangement is for illustration only. With the bedside cabinet on the left side of the bed as shown in FIG. 1, the box 90 and the blocks 91 would be located on top of side section 13 of the module and the gas tubes 52 and 54 would be located on top of side section 14. The conductors of the communication cable 92 are fanned out on the blocks 91 and on the receptacle 83. Communication cable 92 is extended from the blocks 91 into the adjacent vertical tube 25 or 26 thence out of the tube to the receptacle 83. A box 94 covers the cable 92 and that part of the receptacle to which the cable conductors are connected to eliminate the possibility of interference between the 120 volt leads and the communication circuits. The electrical wiring is extended from the various switches, etc., and the junction box 90 in the manner best seen in the circuit diagram in FIG. 19.

In certain instances, a 240 volt circuit may be required. FIGS. 6 and 8 show an outlet box 55 in which a 240 receptacle may be mounted.

As will be seen in FIG. 1, an examining light is located near the top of the inner surface wall 61 of the side section 13 of the module. A similar light is located on the corresponding surface of side section 14. As will be seen in FIGS. 7 and 11 through 15, the louver housing 95 is supported on the outer surface of the side panel 61 by a generally A shaped bracket 96 by a pivot pin 97 which permits limited rotation of the housing around the axis of the pin.

An examining lamp 98, preferably a spotlight of about 75 watts power, is mounted in the distal end of the bracket 96. A louver 99 is fixed in the housing to direct the light beam. A face plate 100 fixed to the housing and located on the side of panel 61 opposite bracket 96, contains a grid which aids in directing the light beam.

Fixed upon plate 100 is a boss 101 in which a notched lock pin 102 is journaled. A lock cap 103 is threaded upon pin 102. Unscrewing the cap loosens the pin and permits movement of the housing and louver to direct the light beam to a desired spot. The lock pin is them tightened to secure the beam at that spot.

Figure 2:
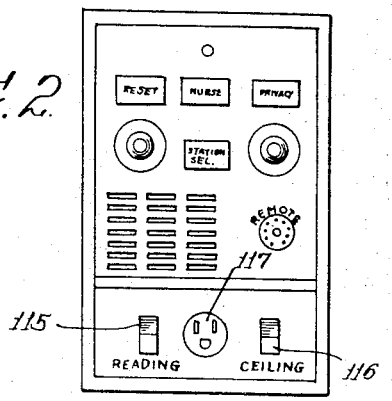
FIG. 2 is a front elevational view of the electronic section of a bedside cabinet.

Switches 70 and 71 are not available to a patient in the bed. In FIG. 1, we have shown a bedside cabinet 20 as an example of one of the many cabinets that can be used with the module. The details of the cabinet are not of the essence of the present invention. As will be seen in FIG. 2, the cabinet contains a switch 115 by which reading lamps 43 are controlled. Switch 115 is a three-position switch. In the center position, lamps 43 on both sides of the module are extinguished. In one end position, one lamp 43 on each side of the module is operated. In the other end position, both lamps 43 on both sides of the module are operated.

The cabinet also contains a switch 116 by which the ceiling lights 48 are operated, and an outlet 117 which renders commercial current available to a patient.

Figure 19:
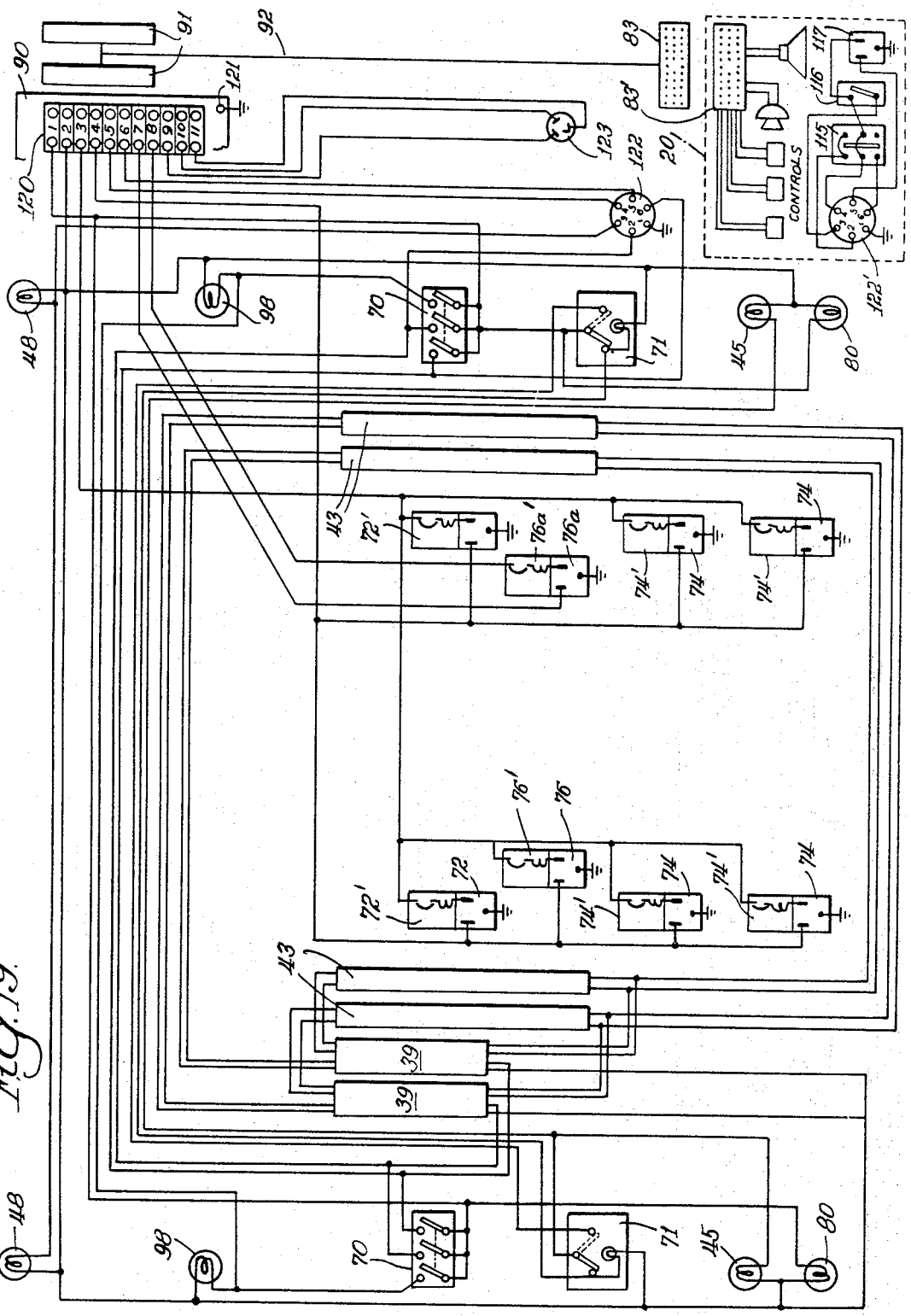
FIG. 19 is a schematic wiring diagram of the module of FIG. 1.

The wiring diagram of the core module shown in the drawings is shown in FIG. 19. As shown, the junction box 90 is equipped with an insulating block 120 that carries eleven pairs of terminals, Power is supplied to the module by the three wire lead system now commonly used. The ground of the power supply is connected to grounding terminal 121 to apply ground to the framework of the core module.

The power conductor of the power supply, not shown, will be connected to righthand terminal 1 to supply power to the lamp switches 70 and 71 and night lamp 80 of the module through wires connected to the lefthand terminal of pair 1 on the block 120. The neutral conductor of the power supply will be connected to terminal 2 and wires leading to the lamps in the module are connected to the lefthand terminal of pair 2.

The power supply will also be connected to the right terminal of pair 3 and wires connected to the left terminal of pair 3 will supply power to the receptacles 72, 74 and one of the receptacles 76. Neutral will be connected to right terminal 4 and wires connected to the left terminal of pair 4 will extend neutral to these terminals.

Power and neutral will be connected to right terminals 5 and 6, respectively, and wires extending from the left terminals of this pair will extend to receptacle 122 through which the bedside cabinet will be connected by a plug 122'. For clarity herein, receptacle 122 is shown as a separate unit although, as explained heretofor, the six wires leading to the receptacle will be connected to points in receptacle 83 as shown at 93 in FIG. 8, and conductors connected to plug 122' will be included in the plug connected to receptacle 83.

Most hospitals provide an emergency power supply which is used when the normal power supply fails. Emergency power and neutral, when provided, will be connected to right contacts 7 and 8, respectively, and wires connected to the left contacts of these pairs will extend to the receptacle 76a to which the hospital bed can be connected if needed. This arrangement permits operating the bed even though the main power supply has failed.

In certain instances, 240 volt supply may be required. 240 volt leads are connected to the right terminals 9, 10 and 11, and wires to 240 volt receptacle 123 connected to the left terminals. Receptacle 123 will be located in a special box such as box 55 shown in FIGS. 6 and 8.

From FIG. 19 it will be seen that the ceiling lights 48 and 75 watt bulbs which are controlled by switch 116 in the bedside cabinet. The examining lights 98 are 75 watt spotlight type bulbs controlled by the upper switches 70 on the side sections of the core module. Switches 70 are three pole single throw switches connected in multiple so that operation of either of the two switches 70 will operate both of the examining lights. In addition to lighting lamps 98, switches 70 operate both reading lamps 43 in both side sections and also operate the ceiling lamp 48 in both side sections. Through this arrangement, adequate light is provided and examination of a patient can be accomplished without the use of an auxiliary examining light. Since switches 70 are connected in multiple, the switch used to turn on the examining lights must be used to turn them off.

The observation lights 45 are shown to be 15 watt lamps and are controlled by the lighted switches 71 upon the core module. Switches 71 are single pole double throw switches arranged so that the operation of either one of them will operate both of the observation lights.

The night light 80, preferably a 7½ watt lamp, is lighted continuously to throw a small light upon the floor of the room alongside of the bed.

Two ballasts 39 are provided and circuit to both of these ballasts controlled by switch 115 upon the bedside cabinet. Switch 115 is a three-position double pole switch having a neutral position in which the circuit through the switch is open. When the switch 115 is closed to its upper position, the ballast connected only to the rear one of the fluorescent lamps on each side is energized, illuminating only those lamps. When the switch 115 is thrown to its lower position, all lamps on each side are energized.

As shown in the drawings, lamps 43 are fluorescent lamps and while this type of lamp is advantageous in that it provides a soft light of intensity sufficient for the purpose intended, the use of other types of lamps is contemplated. In certain instances, it may be advantageous to use tubular incandescent lamps or a string of vertically aligned incandescent lamps uniformly spaced apart. With incandescent lamps, ballasts 39 will not be needed.

Each of the receptacles 72 on the side sections of the core module are protected by the circuit breaking means 72', the reset button of which is available immediately above the socket. Each receptacle 72 is a three-wire receptacle and the ground is connected to the frame of the module. The two receptacles 76 and 76a by which the power may be supplied to the hospital bed, are each protected by a circuit breaking means 76' and 76a', the reset button of which is located just above the receptacle. The ground connection of these receptacles are likewise connected to the frame of the module.

The upper receptacle 74 on each side of the side sections of the module are each protected by circuit breakers 74', the reset button of which is available immediately above the receptacle. The ground connection of each of the receptacles is connected to the frame of the module. The lower receptacles 74 on each side of the side section of the module are also protected by a circuit breaker 74', the reset buttons of which are located immediately above the receptacle. The ground connection of each receptacle is connected to the frame of the module.

In one instance, the circuit breakers 72' and 74' are arranged to open the circuit to the socket when the current therethrough exceeds 15 amperes.

In the drawings, circuit breakers 72' and 74' are shown. In certain instances, these devices may be replaced by cartridge type fuses, if desired.

In October, 1962, the United States Department of Health, Education and Welfare, published a bulletin directed to lighting of hospital patient rooms. This publication was No. 930-D-3. With the wattage of the various lamps as above specified, the conditions specified in this bulletin are met or exceeded in every instance. The use of vertically disposed lamps provides a reading lamp intensity superior to any heretofor used, even when the head section of the bed is elevated and the patient is in a sitting position.

As will be seen in FIG. 16, a mounting frame is used to mount the module upon the headwall of a patient's room. This frame consists of a horizontal channel 106, the web 107 of which is secured to the studding in convenient manner, as by welding. Bolts 108 are projected through the web and secured thereon by welding. Vertical channels 104 extend upwardly from the ends of channel 108 and the webs of these channels contain a plurality of uniformly spaced apart bolt holes. A ceiling boot 105 is secured to each channel 104 by a bolt extending through one of the bolt holes in channel 104. Since the module 10 is to be mounted a predetermined distance above the floor 16 of the room, the top of the module will be a fixed distance above that floor. Ceiling heights in hospital rooms vary over a wide range. The bolt holes in channels 104 permit locating the ceiling boots 105 at the proper place for a particular ceiling.

As will be seen in FIGS. 4 and 17, the top horizontal bar 27 of the module framework is a rectangular tube. The upper wall of tube 27 contains a pair of holes through each of which the shank of a collared screw 114 is projected with the collar 114' of that screw engaging the inner face of that wall. A washer surrounds the shank of screw 114 and a pin is projected through the shank to hold the screw in the bar. A leveling wedge 113 is threaded upon each screw 114. The bottom and side walls of the bar 27 are cut away to permit placing the wedge within the bar.

As will be seen best in FIG. 18, each bracket 109 is secured to channel 106 by bolt 108. When the module is hung on the wall brackets 109 extend through the cut away portions of bar 27 into engagement with leveling wedges 113. Channels 106 are supposed to be horizontal. The shanks of screws 114 are shaped to receive a wrench by which the screws can be turned to raise or lower the wedges 118 as required to level the module.

As will be seen in FIGS. 4 and 8, the bottom plate 31 contains perforations shown to be three in number through which screws are extended to fix the bottom of the module with respect to the headwall. As will be seen in FIG. 8, the plate 31 has an upwardly extending flange 110 portion spaced a slight distance from vertical members of the framework. The plate also has a flare 111 at its lowest edge. After the screws have been inserted through the plate, a cover plate 112 is hooked over the flange 110 and at its lower ends snapped over the flare 111 to complete the mounting of the module upon the wall. The cover plate 112 is the only part of the core module that is added to the module at the point of mounting of the same.

From the foregoing it will be apparent that the core module of the present invention possesses many advantages. Since the module is completely fabricated, equipped, wired, tested and enclosed at the factory for shipment to a hospital as a unitary structure to be mounted upon the headwall of a patient's room, the cost of constructing the headwall is greatly reduced since it is an ordinary wall, except for the addition of a mounting plate or channel for each bed to be installed against the wall. The core modules are equipped with eight outlets so that ample outlets are available for connecting up whatever electrical equipment that is to be used with the bed. Each outlet is protected by a circuit breaker so the danger of overloading the circuit is eliminated. Each side of the module is equipped with a grounding bar to which grounds required by equipment used in connection with the treatment of the patient can be connected in a convenient manner.

The provision of vertically disposed lamp means positioned outwardly from the headwall of the room and having reflectors directing the light across the bed from each side thereof is advantageous. A patient in the bed holding reading material in a normal reading position will find that material adequately lighted and free from shadows. A patient sitting in an upright position in a retractable bed will find this lighting an improvement over lighting available heretofor.

Referring now to the embodiment of FIGS. 20 through 26, there is illustrated a slightly modified form of the invention. A service unit or module generally designated 210 is shown which includes a wall section 211 adapted to be mounted upon the headwall of a hospital room. It further includes a pair of side sections 213 and 214 extending forwardly from the wall section. As in the previous embodiment, the module is associated with a hospital bed 219 and a bedside cabinet 220.

Figure 21:
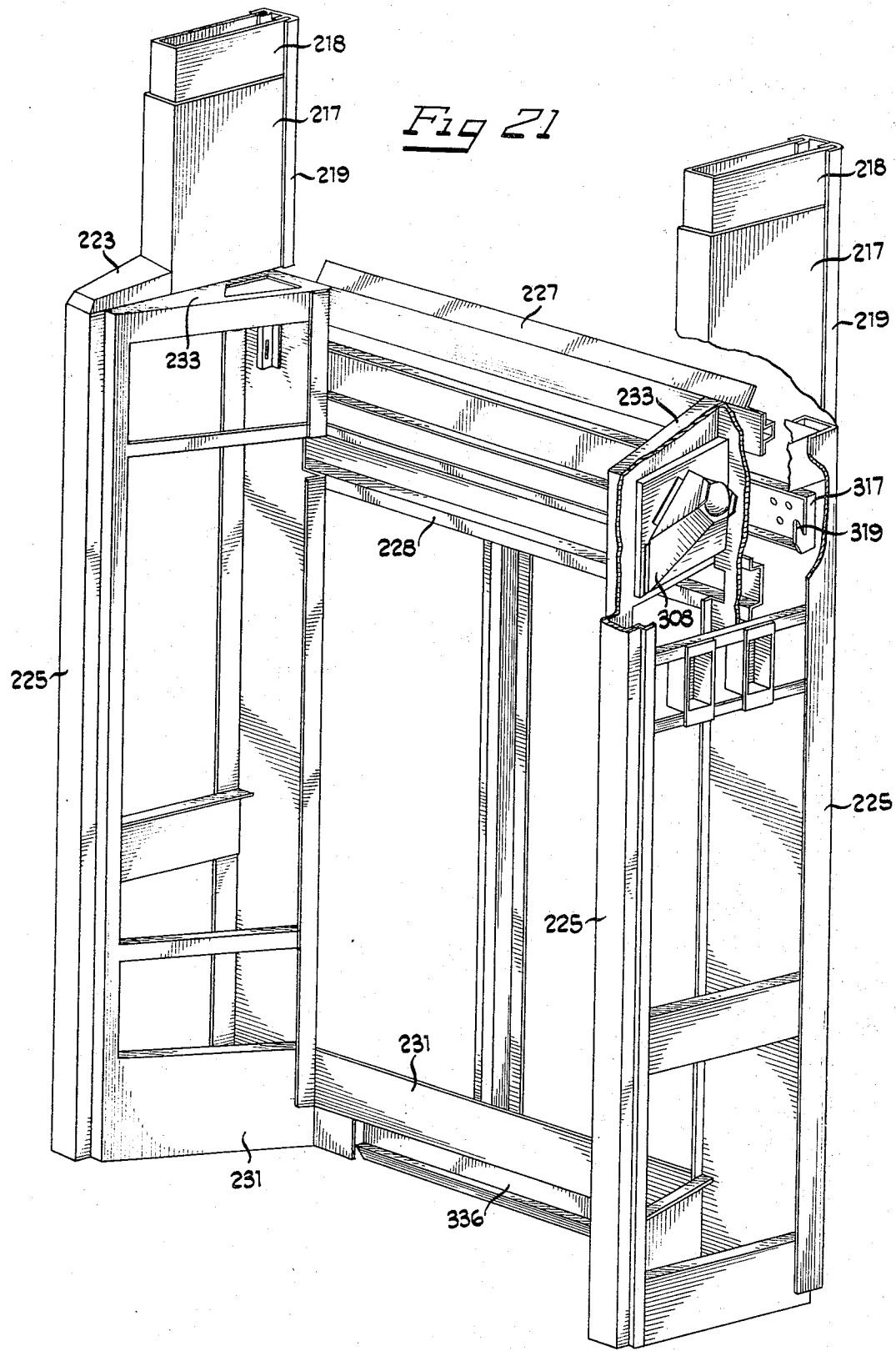
FIG. 21 is a partially broken away perspective view of a portion of the internal structure of the unit of FIG. 20.

As last seen in FIG. 21, the service unit includes a framework generally similar to the framework of the previous embodiment and which defines the wall and side sections. It comprises interconnected vertical channels and tubes 225, horizontal bars 227, and horizontal cross channel 228. The upper and lower ends of the side sections 213 and 214 are enclosed by apertured plates 231 and 233 as in the previous embodiment.

The wall section 211 is covered by a decorative backwall panel 260 and each side section is covered with a face panel 261 hinged to the backwall panel, as at 262, to provide access to the interior of each side section.

As in the embodiment of FIG. 1, each side section 213 and 214 is provided with a plurality of lighting facilities. Also, the headwall section 211 is clear; that is, none of the patient care facilities are provided in the headwall portion. This is important in that the possibility of accidents and injuries due to inadvertent contact of fracture equipment, I.V. rods, or other equipment normally utilized adjacent the bed headboard with the service facilities of the module 210 are eliminated.

Each side section includes an observation lamp 245, a ceiling lamp 247, a reading lamp 243 and an examining light 298. These lamps include fixtures supported upon the framework of the module internally of the face panels 261. Lamp lenses are provided in the side face panels 261 in overlying relation to the respective lamps. The face panels may be hinged open at the hinges 262 to service the lamp units.

The side sections additionally include night lamps 280 which burn continuously and provide minimal illumination to aid hospital personnel in moving about on night duty.

Figure 22:
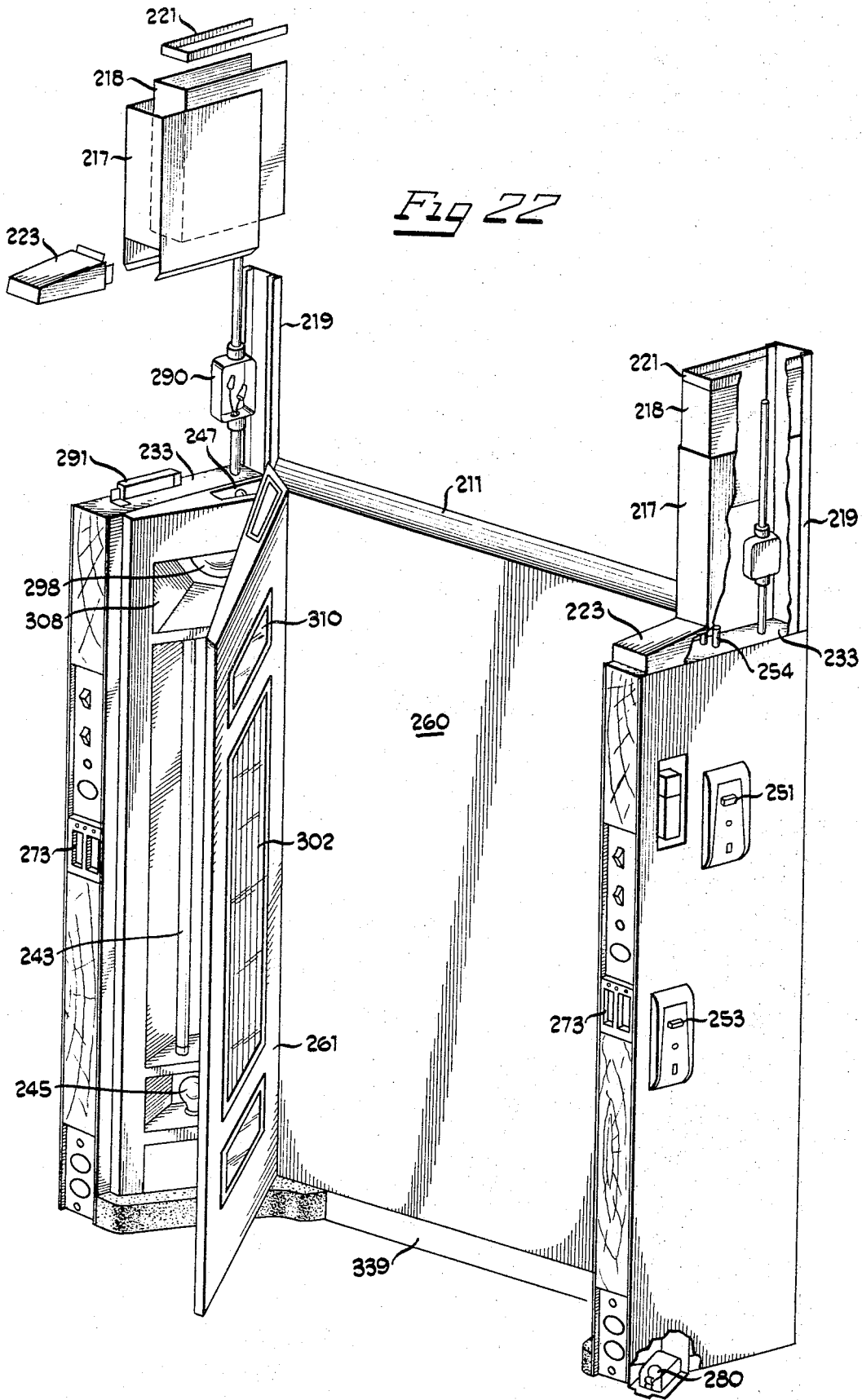
FIG. 22 is a perspective view of the apparatus of FIG. 20 illustrative of certain features of internal construction.

As seen in FIG. 22, the side sections 213 and 214 include outer panels 360. At least one of the side sections 213 and 214 may include facilities for medical gas services. As illustrated, appropriate valves are supported on the framework, such as oxygen valve 251 and suction valve 253 and are available at the outer panel 360.

The outward extremities of the side sections 213 and 214 are provided with channels of anodized aluminum. Portions of these channels are covered with high pressure laminate inserts 267 for decorative purposes.

The channels may also support grounding receptacles 273 which provide grounding means for medical lreatment apparatus. The receptacles include apertures for insertion of common sizes of grounding plugs. The receptacles are connected by a braided ground lead disposed internally of the framework. The lead is, in turn, connected to the building ground. The braided lead is sized to provide equal potential grounding regardless of which of the receptacles 273 are utilized.

Figure 20:
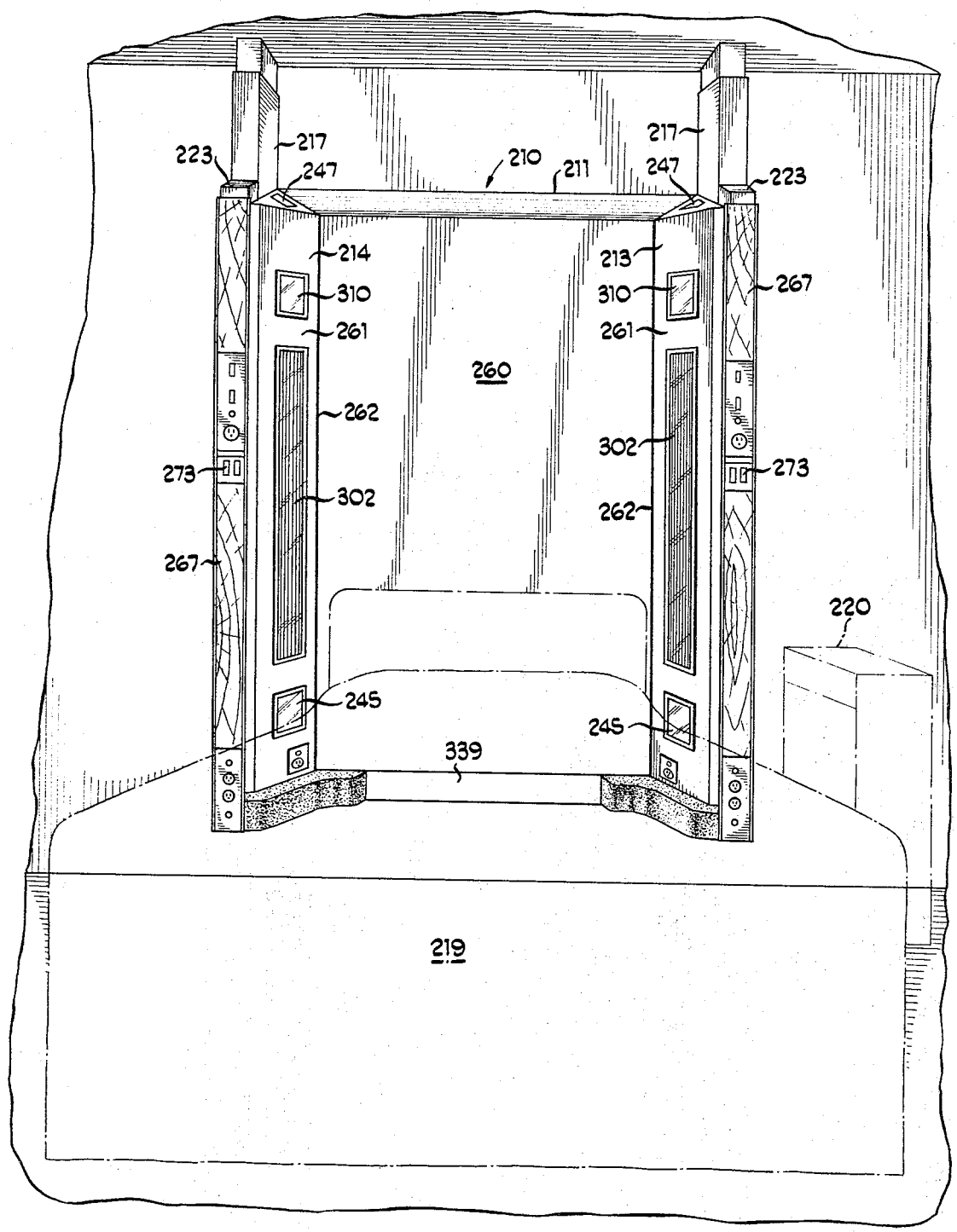
FIG. 20 is a perspective view of a slightly modified service unit illustrative of the principles of the present invention.

The module 210 of the embodiment of FIG. 20 includes electrical operating switches, electrical receptacles, receptacle grounds and fuses, communication wiring and services, telephone services and emergency power arranged generally similarly to those of the embodiment of FIG. 1. However, it should be noted that many and varied modifications of these features may be made without departing from the scope of the invention.

Electrical, electronic and gas facilities are connected to the service unit or module 210 from the ceiling of the hospital room. The modules are completely prewired, piped and assembled and are provided with means available at the upper end of one or both of the side sections 213 and 214, to facilitate these connections. For example, in the illustrated embodiment, a low voltage terminal block 291 and a line voltage junction box 290 are provided for electonic and electrical connections. Exposed pipes 254 are provided for connection to the hospital gas systems.

Service covers 217 are provided which extend between the upper plates 233 of the side sections 213 and 214 to cover the service connections. In this embodiment, as best seen in FIG. 22, each service cover includes an elongated columnar portion 218 having a width less than the outward protrusion of the side sections 213 and 214. The columnar portions extend between the top plate 233 of the side sections and the ceiling and conceal the service facilities.

Each columnar section is formed of two longitudinally slidable members which may be adjusted to accommodate varying ceiling heights. A gasket web 219 is secured to the headwall of the bed and receives the abutting edges of the columnar portion. A ceiling gasket 221 receives the upper end of the columnar portion adjacent the ceiling of the room.

A low profile portion 223 of the service cover extends between the outer extremity of the side sections 213 and 214 and the columnar portion 217. It overlies and conceals the terminal block 291. This portion of the cover may be readily removed for securing of the communication and electronic systems without disturbing the columnar portions of the covers.

The reading lamps 243 of the embodiment of FIG. 22 are similar to the reading lamps of the previously described embodiment. Switches are similarly provided to control the sequence of operation as in the embodiment of FIG. 1.

Figure 23:
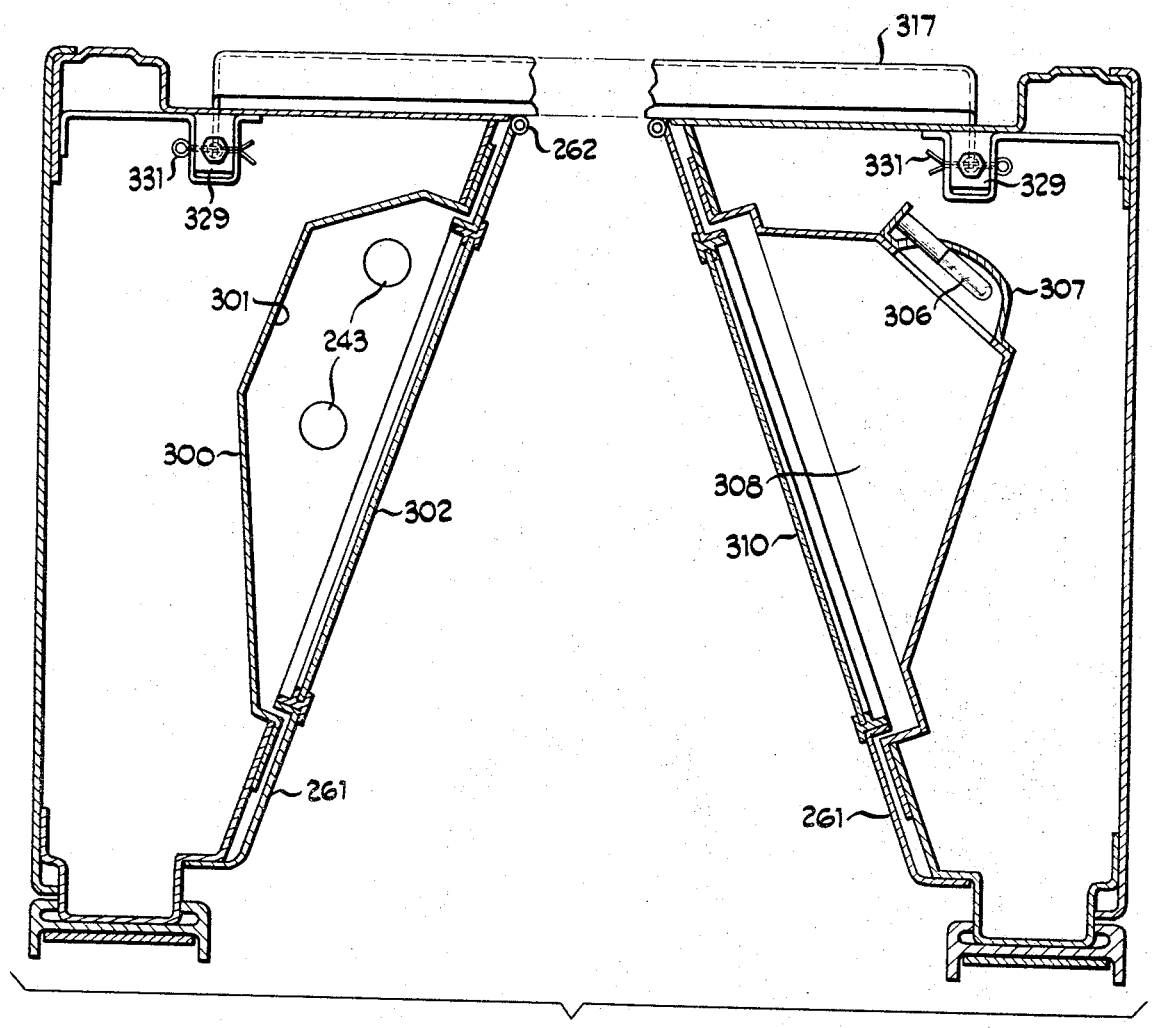
FIG. 23 is a sectional view of the apparatus of FIG. 24 taken generally along the line 23—23 of that figure.

The lamps 243 each include a housing 300 supported by the patient service unit framework. As shown in FIG. 23, the housing 300 of each lamp forms a reflector 301 adjusted to maximize the reflected light outward in a generally convergent pattern toward the patient area.

Lenses 302 are provided in the side face panels 261 which overlie the lamps 243. Each is adapted to diffuse the emitted light to reduce glare and concentrate the light rays on the desired area of use, regardless of elevation of the head portion of the bed 219.

Figure 24:
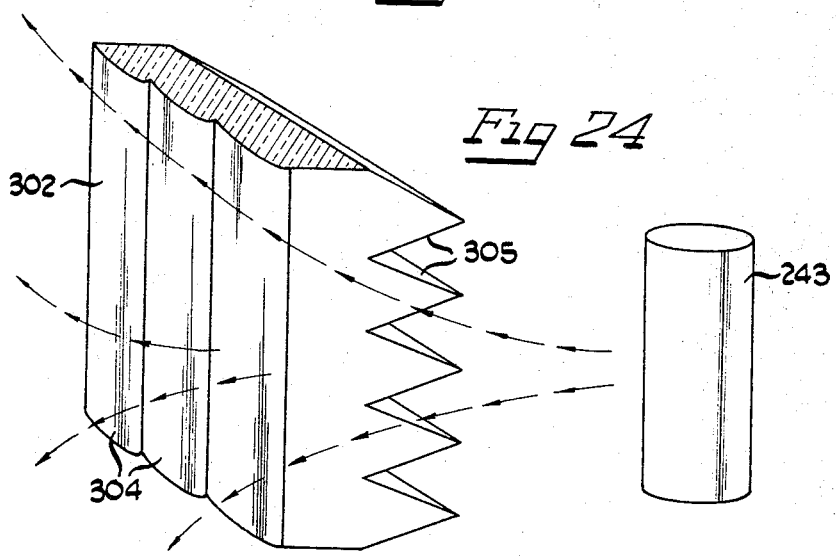
FIG. 24 is a fragmentary perspective view on an enlarged scale of a portion of the unit illustrated in FIG. 20.

As best seen in FIG. 24, the lens 302 associated with each lamp 243 is formed of translucent plastic and includes a plurality of longitudinally extending vertical flutes 304 upon its exterior surface. In addition, a plurality of horizontally disposed prismic projections 305 are provided on the interior surface.

The flutes 304 diffuse the light rays horizontally and the prismic notches 305 refract the light rays vertically. Prismic notches 305 reduce direct outward light rays to a minimum and eliminate disturbing glare. Also, the light directed upwardly provides soft illumination for the general area and the downwardly and inwardly directed rays concentrate the light for patient reading comfort. Utilizing 30 watt fluorescent tubes with all four illuminated, an illumination of 55 foot candles was obtained measured in the reading zone nominally 45 inches above the floor and 40 inches from the headwall of the room with the head portion of the bed elevated to 45°.

The examination lights 298 differ substantially from those of the previous embodiment. These lights include a high density light source in the form of a quartz halogen bulb 306 supported in a parabolic reflector 307. Each light source 306 and reflector 307 is supported in one side section 213 and 214 upon a tunnel like housing 308 shown in FIGS. 21, 22 and 23. This arrangement for positioning of the light sources inwardly of the side sections 213 and 214 provides a generally convergent light pattern and places them out of the normal field of vision of individuals facing the module unit 210. This reduces the direct glare which would interfere with the examination process.

The parabolic reflector 307 includes a plurality of generally rectangular facets positioned to concentrate light upon the bed surface. Utilizing a 150 watt 120 volt quartz halogen lamp in each examination light, and with the reading light on, a minimum of 150 foot candles is provided at the bed surface, head end, 125 foot candles at the torso area and 50 foot candles at the foot area.

A lens 310 is provided in each face panel 261 in overlying relation to the open end of the tunnel like housing 308. The lens 310 is formed of glass which reflects heat inwardly back toward the light source. This prevents impingement of undesirable heat rays upon the bed or upon the patient. This is particularly important in burn cases where any amount of external heat causes extreme discomfort. A suitable glass lens is thick rolled tempered Owens-Corning "Pyrex" (trademark) glass having an infra-red reflective coating upon the inner surface.

Figure 26:
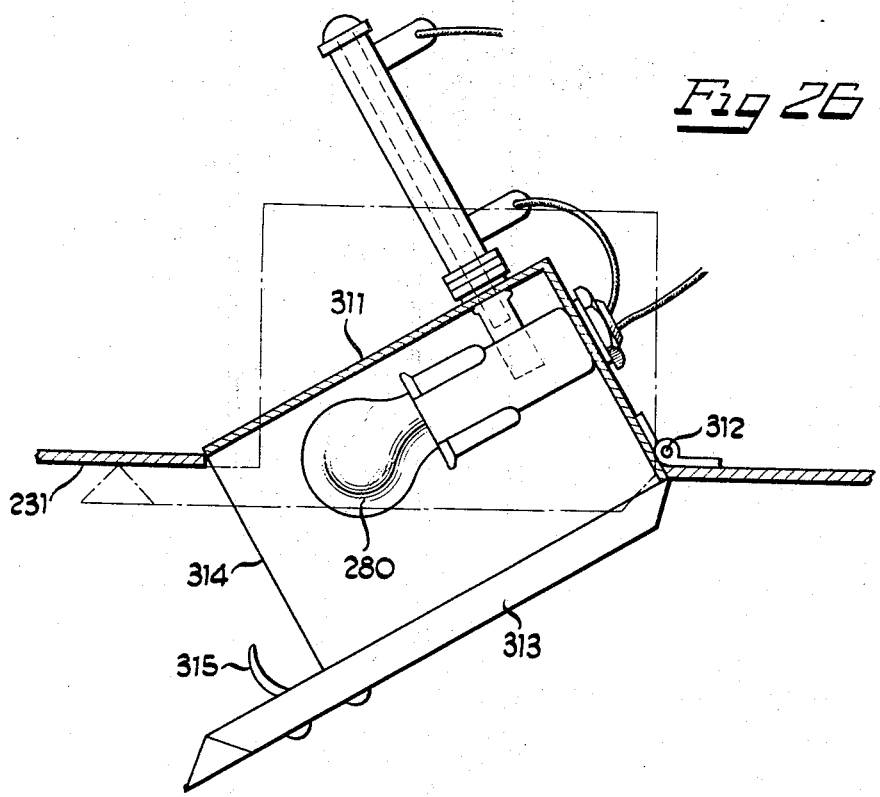
FIG. 26 is a fragmentary sectional view of a portion of the unit illustrating another feature of the invention.

The night lights 280, best seen in FIG. 26, are supported within an aperture in each of the lower plates 231 of the side sections 213 and 214.

The lights 280 include a housing 311 supported upon each of the lower plates 231 by a hinge 312. The housing 311 defines a cover 313 and an open end 314 for light emission. It is pivotal between a closed position with the cover 313 overlying the aperture and an open position with the open end 314 directed angularly downwardly. A spring 315 acts against one edge of the lower plate 231 to retain the light in the closed position. When open, a corner of the housing 311 engages the lower plate to retain the housing in the open position for direction of light angularly downwardly upon the floor generally parallel to the bed.

A 7.5 watt 120 volt bulb is utilized in each night light. This provides adequate illumination to silhouette the bed, adjacent furniture and other objects to permit movement within the room.

Figure 25:
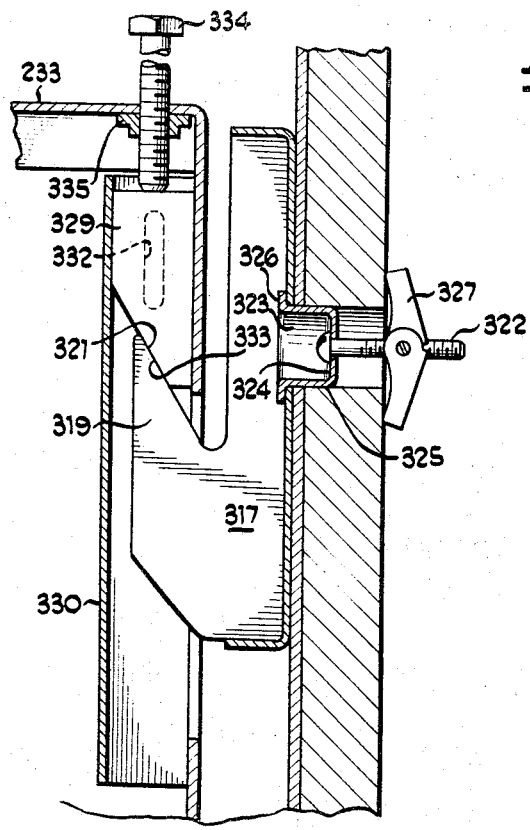
FIG. 25 is a partial sectional view of the service unit taken generally along the line 25—25 of FIG. 23.

The service unit 210 is supported upon the headwall of the hospital room by a bracket 317 shown in FIGS. 21, 23 and 25. The bracket includes a pair of spaced apart upwardly directed hooks 319. The hooks include oblique load receiving surfaces which engage mating surfaces 321 associated with the service unit to support the unit upon the wall.

Bracket 317 is secured to the headwall by toggle bolts 322. The toggle bolt includes a wing portion 327 which is inserted internally of the wall through appropriately formed apertures in the bracket and headwall. Tightening of the toggle bolt causes the wing to engage the inner surface of the headwall and draw the bolt head inwardly.

The toggle bolts cooperate with cup-shaped retainers 323 which urge the bracket 317 against the wall and also receive shear loads between the wall and bracket to prevent vertical movement of the bracket.

The cup-shaped retainers each include an apertured central web 324 which receives the head of the toggle bolt 322. It further includes a tubular wall 325 and a flange 326 extending radially outwardly of the tubular wall.

The radial flange 326 engages the outer surface of the bracket 317. As the bolt is tightened, the flange forces against the bracket to urge it against the wall.

The tubular wall 325 is sized approximately to the diameter of the apertures in the bracket 317 and headwall through which the wing portions 327 are passed.

When positioned in the aperture the tubular portion engages both the bracket and the headwall to prevent relative sliding movement. This insures the bracket will remain in the proper vertical location upon the wall.

Steel screws into steel wall studs are sometimes used along with the toggle bolts to secure bracket 317 to the wall.

The service unit 210 includes a pair of support blocks 329 best seen in FIGS. 23 and 25 which cooperate with the bracket hooks 319 to support the unit upon the headwall. The blocks 329 are disposed adjacent the upper plates 233 in vertical channels 330 which are spaced to align with the hooks 319. Apertures are provided in the rear wall of the unit to allow passage of the hooks into the channels.

The blocks 329 are adapted to slide upwardly and downwardly within the channels. This movement is limited by cotter pins 331 which pass through transverse slots 332 in the blocks 329.

The blocks include oblique contact surfaces 333 which engage the surfaces 321 of the bracket hooks to support the unit 210 upon the bracket. The cooperating oblique surfaces cause the unit to be urged tight against the wall surface.

An adjustment screw 334 is threadedly supported above each support block 329 in bosses 335 secured to the upper plates 233. Downward adjustment of these screws limits the maximum upward movement of the blades 329.

Leveling of the unit 210 is achieved by adjustment of the screws 334 to establish the upward limit position for each block.

A removable cover panel 339 is provided at the lower extremity of the backwall panel 260. A securing plate 336 (see FIG. 21) forming part of the service unit framework is disposed behind the cover panel. Appropriate fasteners are utilized to connect the plate 336 to the headwall to further affix the unit 210 to the headwall.

While we have chosen to illustrate and describe our invention in connection with particular embodiments thereof, this has been done by way of example only as there are many modifications and adaptions which can be made by one skilled in the art within the teachings of the invention. As shown, the service module is equipped to have the bedside cabinet upon the lefthand side of a patient in the bed. In a semi-private or two-bed ward, one bed will be equipped in this manner, and the other bed preferably equipped so that the bedside cabinet is located at the righthand side of a patient in the bed. These and other modifications are contemplated.

Having thus complied with the statutes and shown and described a preferred embodiment of the invention, what we consider new and desirable to have protected by letters patent is pointed out in the appended claims.

What is claimed is:

1. A hospital room service unit comprising:
   a. a framework adapted for connection to a wall in cooperative association with a bed,
   b. at least one electrical lighting facility supported on said framework,
   c. said electrical lighting facility being exposed to the exterior of said unit to render said service available for use,
   d. connection means supported by said framework for connection of said electrical lighting facility to an external source of power, said means being accessible at the exterior of said unit at the top thereof,
   e. conductor means supported internally of said framework connecting said electrical lighting facility to said connection means, and
   f. at least one removable service cover extending upwardly of said framework in concealing relation to said connection means.

2. A hospital room service unit as claimed in claim 1 wherein said unit further includes electrical receptacle facilities supported thereon and exposed to the exterior thereof to render them available for use and said conductor means connect said electrical receptacle facilities to said connection means.

3. A hospital room service unit as claimed in claim 1 wherein said unit includes medical gas and vacuum service facilities supported on said framework and exposed to the exterior of said unit away from the view of the patient to render said service available for use and said connection means include conduits communicating with said gas service facilities internally of said unit.

4. A hospital room service unit as claimed in claim 1 wherein said unit includes at least one electronic and communication service receptacle for connection with associated electronic and communication equipment, said connection means including means for connection of said electronic and communication service receptacle to an external source, and said unit includes conductors internally of said framework connecting said receptacle to said connecting means.

5. A hospital room service unit as claimed in claim 1 wherein said unit includes grounding service facilities supported by said framework and exposed to the exterior of said unit to render them available for use, and said connection means includes braided cable conductors connected to said grounding service facilities.

6. A hospital room service unit comprising:
   a. a framework adapted for connection to a wall in cooperative association with a bed,
   b. panels supported by said framework in overlying relation thereto, said framework and panels defining a wall section adapted for disposition in contact with the supporting wall adjacent the head end of the associated bed and a pair of spaced apart side sections extending outwardly of said wall section and adapted for disposition adjacent opposite sides of the bed,
   c. at least one electrical lighting facility supported on said framework, and
   d. said electrical lighting facility being accessible at the exterior of said unit to render said service available for use.

7. A hospital room service unit as claimed in claim 6 wherein said electrical lighting facility is disposed in at least one of said side sections and said wall section is clear of all patient care facilities.

8. A hospital room service unit as claimed in claim 6 wherein said side sections include means for abutting contact with the bed for positioning of the bed with respect to said wall and side sections.

9. A hospital room service unit as claimed in claim 6 wherein said side sections are generally vertically elongated.

10. A hospital room service unit as claimed in claim 10 wherein panels on said vertically elongated side sections extend from said wall section in spaced apart opposed divergent facing relation.

11. A hospital room service unit as claimed in claim 9 wherein said panels on said side sections are hingedly supported by said wall section.

12. A hospital room service unit as claimed in claim 6 wherein said electrical lighting facility includes an observation light disposed in each said side sections in generally opposed facing relation, said lights being positioned in said side sections to generally align with the level of the associated bed.

13. A hospital room service unit as claimed in claim 6 wherein said electrical lighting facility includes a reading light disposed in each said side section in generally opposed facing relation and being disposed to direct light in a generally convergent pattern.

14. A hospital room service unit as claimed in claim 6 wherein said electrical lighting facility includes an examining light disposed in each said side section in generally opposed facing relation, said lights being positioned to direct light downwardly and inwardly in a converging pattern.

15. A hospital room service unit as claimed in claim 6 wherein said electrical lighting facility includes a ceiling light disposed in each said side sections being generally upwardly facing and adapted to direct light generally upwardly.

16. A hospital room service unit as claimed in claim 6 wherein said electrical facility includes a night light disposed in at least one of said side sections, said light being generally downwardly facing.

17. A hospital room service unit as claimed in claim 10 wherein said electrical lighting facility includes an observation light disposed in each said side section in position for general alignment with the associated bed and wherein said outer panels of said side sections include lenses supported in overlying relation to said lights.

18. A hospital room service unit as claimed in claim 10 wherein said electrical lighting facility includes a vertically disposed elongated reading lamp disposed in each said side section, and disposed to direct light in a generally convergent pattern and wherein said outer panels of each said side sections include a lens supported in overlying relation to said lamps.

19. A hospital room service unit as claimed in claim 18 wherein each said lens includes a plurality of generally vertically directed flutes to diffuse emitted light in a generally horizontal diverging pattern and said lens further includes a plurality of horizontally directed prismic notches to refract emitted light in a generally vertical divergent pattern.

20. A hospital room service unit as claimed in claim 10 wherein said electrical lighting facility includes an examination light disposed in each said side section and wherein said outer panels of each said side section include a lens associated with said examination light, said lights and lenses being aligned to provide a generally downwardly directed convergent light pattern.

21. A hospital room service unit as claimed in claim 20 wherein said examination lights each include light source supported in a generally parabolic reflector, said reflector being supported on a tunnel like housing internally of said side section and in spaced relation to said lens, and generally upwardly thereof, said light source, reflector and housing cooperating to direct light in a generally downwardly convergent pattern toward the bed surface.

22. A hospital room service unit as claimed in claim 10 wherein at least one of said side sections includes a night light generally downwardly directed and adapted to direct light generally downwardly.

23. A hospital room service unit as claimed in claim 10 wherein said unit additionally includes electrical receptacle facilities exposed externally of said panels to render them available for use.

24. A hospital room service unit as claimed in claim 23 wherein said unit further includes grounding service facilities supported internally of said framework, and exposed to the exterior of said unit at each said side section to render said service available for use, said grounding service facility further being connected to each said receptacle, said grounding service facility including braided cable conductors connected to said grounding service facilities to provide equal potential grounding.

25. A hospital room service unit as claimed in claim 10 wherein said unit further includes medical gas service facilities supported on said framework and exposed to the exterior of said panels out of sight of the patient to render said service available for use.

26. A hospital room service unit as claimed in claim 25 wherein said medical gas service facilities include at least one medical gas valve and at least one vacuum valve supported in one of said side sections.

27. A hospital room service unit as claimed in claim 10 wherein said unit further includes at least one electronic and communication service receptacle for connection with associated electronic and communication equipment, said receptacle being disposed in the bottom of one of said side sections.

28. A hospital room service unit as claimed in claim 10 wherein said unit engages a integrally formed bracket adapted to be secured to the associated wall, said bracket supportingly engages said framework.

29. A hospital room service unit as claimed in claim 28 wherein said bracket includes a pair of spaced apart hooks defining obliquely directed support surfaces and said unit includes a pair of support blocks slidably retained in said framework in spaced apart relation, each said block includes a corresponding obliquely directed contact surface adapted to engage the obliquely directed contact surface of one of said hooks, said unit further includes limit screws threadedly supported by said framework in operative association with said support blocks, said screws limiting the upward movement of said blocks and being adjusted to vary said upward limit, said framework further defining apertures spaced to allow entry of said hooks into cooperating supporting relation with said support blocks.

30. A hospital room service unit as claimed in claim 10 wherein said unit includes connection means supported by said framework for connection of said electrical facilities to an external source, said connection means being exposed to the exterior of said unit at the top of at least one of said side sections.

31. A hospital room service unit as claimed in claim 30 wherein said unit includes at least one removable service cover extending upwardly of said framework in concealing relation to said connection means.

32. A hospital room service unit as claimed in claim 30 wherein said unit further includes medical gas and vacuum service facilities supported on said framework and exposed to the exterior of said panels out of sight of the patient to render said service available for use and said connection means includes conduits internally of said unit communicating with said gas service facilities.

33. A hospital room service unit as claimed in claim 32 wherein said electrical lighting facility includes in each said side section an observation light disposed for general alignment with the associated bed, a vertically disposed elongated reading lamp disposed above said observation lamp and disposed to direct light generally inwardly of said side section, and an examination light disposed above said reading light, said examination lights being disposed to direct light generally downwardly and inwardly.

34. A hospital room service unit as claimed in claim 10 wherein said electrical lighting facility includes a ceiling light disposed in each said side section, said ceiling lights being generally upwardly facing and adapted to direct light generally upwardly.

35. A wall hung hospital service unit for providing services to a bed patient from external sources disposed above the unit comprising at least two vertically elongated side sections extending outwardly of said wall and adapted for disposition on opposite sides of the bed, electric lighting facilities disposed in said side sections and adapted to illuminate areas generally intermediate and outwardly of said side sections, connection means disposed adjacent the top of at least one of said side sections connected to said external sources above the unit, conductor means internally of said side sections connected between said connection means and said electrical lighting facilities.

36. A wall hung hospital service unit as claimed in claim 35 wherein said electrical lighting facilities include in each said side section an observation light disposed for general alignment with the associated bed, a vertically disposed elongated reading lamp disposed above said observation lamp and disposed to direct light generally inwardly of said side section, and an examination light disposed above said reading light, said examination lights being disposed to direct light generally downwardly and inwardly.

37. A hospital room service unit comprising:
a. a framework adapted for connection to a wall in a cooperative association with a bed,
b. at least one electrical lighting facility supported on said framework,
c. said electrical lighting facility being exposed to the exterior of said unit to render said service available for use,
d. connection means supported by said framework for connection of the electric lighting facility to an external source of power,
e. conductor means supported internally of said framework connecting said electrical lighting facility to said connection means, and
f. bed positioning means to guide and position the associated bed upon movement of the bed toward said unit, including a pair of spaced apart facing bed contacting surfaces which diverge toward the associated bed.

38. A hospital room service unit as claimed in claim 37 wherein said electrical lighting facility includes at least one observation light positioned generally in line with the level of the associated bed.

39. A hospital room service unit as claimed in claim 37 wherein said electrical lighting facility includes a pair of reading lights disposed to direct light in a generally convergent pattern.

40. A hospital room service unit as claimed in claim 37 wherein said electrical lighting facility includes a pair of examining lights disposed in generally opposed facing relation, and being positioned to direct light generally downwardly and in a converging pattern.

41. A hospital room service unit as claimed in claim 37 wherein said electrical lighting facility includes at least one ceiling light disposed in generally upwardly facing relation and adapted to direct light generally upwardly.

42. A hospital room service unit as claimed in claim 37 wherein said electrical lighting facility includes at least one night light disposed in a generally downwardly facing direction and being adapted to direct light generally downwardly.

* * * * *

Disclaimer and Dedication 3,769,502.—*John R. Schultz*, *John W. Heidacher*, *John M. Sharer*, and *James S. Adams*, all of Batesville, Ind., and *Frank M. Damico*, Plover, Wis. Patent dated Oct. 30, 1973. Disclaimer and dedication filed June 14, 1974, by the assignee, *Hill-Rom Company, Inc.*

Hereby disclaims and dedicates claims 5, 11, 19, 20, 21, 24, 28 and 29 of said patent.

[*Official Gazette October 15, 1974.*]